April 29, 1952     J. A. RIDGWAY, JR     2,594,585
FRACTIONATING APPARATUS

Filed Oct. 31, 1946

Inventor:
John A. Ridgway, Jr.
By Vandeveer Voorhees
Attorney

Patented Apr. 29, 1952

2,594,585

UNITED STATES PATENT OFFICE 2,594,585

FRACTIONATING APPARATUS

John A. Ridgway, Jr., Texas City, Tex., assignor to Pan American Refining Corporation, Texas City, Tex., a corporation of Delaware Application October 31, 1946, Serial No. 707,025

10 Claims. (Cl. 261—95)

This invention relates to a fractionating apparatus for the distillation and separation of liquids and it relates more particularly to a fractionating tower packing structure. An object of the invention is to provide a fractionating tower packing structure of high fractionating efficiency which will provide a large area of efficient contact between vapor and reflux liquids. Another object of the invention is to provide a tower packing structure which is conveniently removable and replaceable and adapted for use in fractionating towers of various sizes and structural arrangements. Another object of the invention is to provide a packing structure for fractionating towers in which the elements of the structure itself provide passages for upflowing vapors and downflowing reflux within each element, thus avoiding wasteful utilization of space within the tower occupied by liquid pools, reflux downcomers, vapor ducts, etc. Other objects of the invention will be perceived from the following description thereof.

Figure 1:
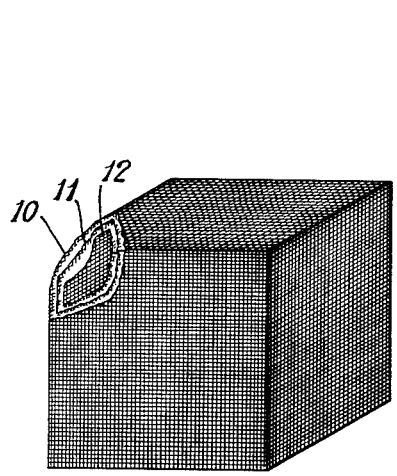
Figure 2:
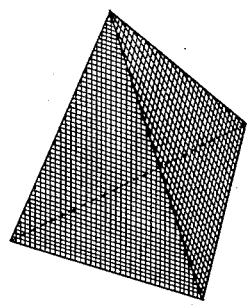
Figure 3:
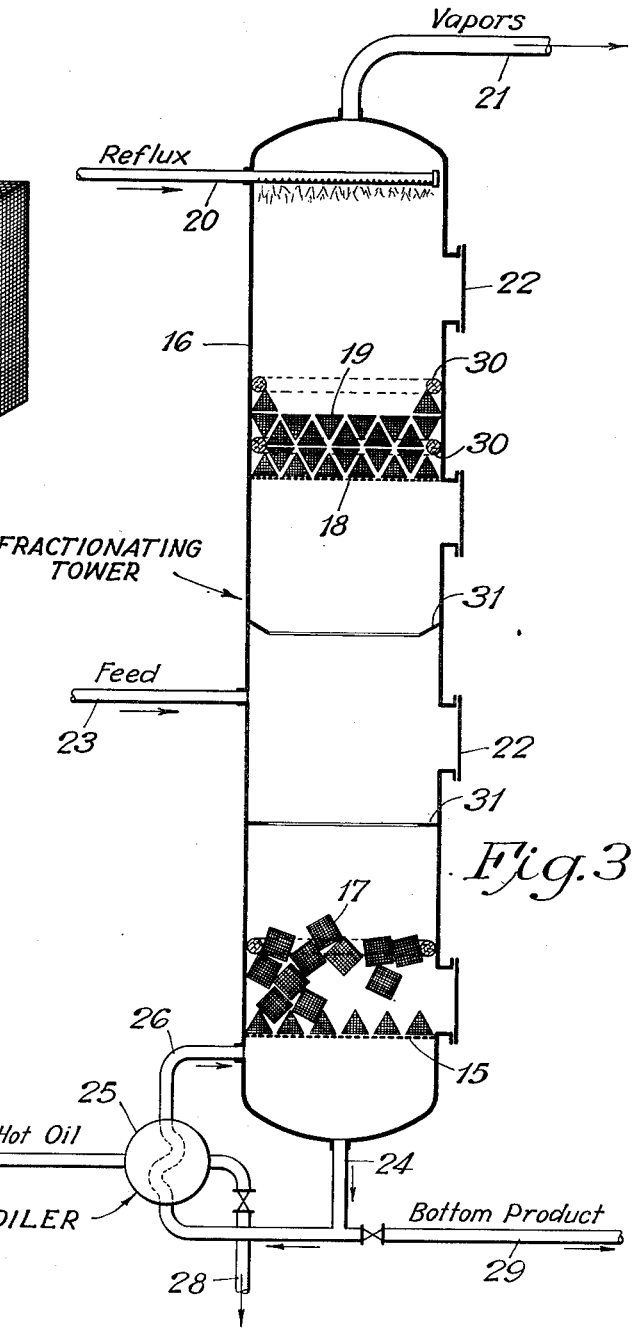

The invention is illustrated by a drawing in which Figures 1 and 2 are diagrammatic illustrations of the tower packing elements which form the subject matter of my invention. Figure 3 illustrates the method of application of the tower packing elements of the invention in a typical fractionating apparatus.

In the separation of liquids by fractionation, it has long been a problem to maintain equilibrium between the reflux liquid flowing downwardly thru the fractionating tower and the vapors rising therein. In an ideal fractionating column, perfect equilibrium would be obtained between the liquid and vapors in successive levels within the column and the distance between the successive levels would be infinitely short, making it possible to obtain complete separation of liquids in a column of very short height. At the same time the amount of reflux liquid required for the operation of such a column would be very small. No fractionating tower actually in use approaches the theoretical very closely for a number of practical reasons, one of them being the difficulty of attaining equilbrium between vapor and liquid in a short distance within the tower. Attempts to solve this problem led to the use of tower packing providing a large surface such as Raschig rings, screens made of woven wire or perforated metal plates, coiled wire springs, saddles, and a multitude of other shapes. The tower packing structures of this type suffer from two fundamental disadvantages: the first is the tendency of such packings to flood with reflux liquid unless the operation is very carefully controlled within a critically narrow range, that is, a critical control of vapor velocity upward thru the tower to volume of downflowing reflux which can also be defined in terms of reflux ratio. The second disadvantage of large surface packing structures is the tendency toward bypassing or channeling by which is meant a segregation of vapor in one part of the tower with reflux liquid in another, thus substantially avoiding contact and failing to attain equilbrium conditions. Any orderly arrangement of tower-packing elements such as rings, coils, saddles, etc. usually tends to aggravate the channeling tendency and accordingly it is common practice with such packing structures to place them in the tower in haphazard arrangement in the somewhat vain hope of avoiding, by accident as it were, the construction of liquid and vapor channels.

The bubble tower is a device which avoids the difficulties and uncertainties of channeling and flooding by insuring an orderly flow of vapors and liquids thru the tower with specified control of contact between them on each plate. As a result the bubble tower has the desirable characteristic of a wide operating range, i. e. a high degree of flexibility. Unfortunately in order to attain this end it has been necessary in the bubble tower to sacrifice the high fractionating efficiency which is characteristic of the large surface tower packings mentioned hereinabove which provide high contact efficiency but are cursed with a critically narrow operating range. It is an object of this invention to obtain both the high fractionating efficiency of the large contact surface packing structures with the reliable performance and wide operating range obtainable in the bubble plate structure.

The fractionating column packing of this invention comprises a mass of hollow polyhedral shapes, each having matted walls in which contact with liquid and vapor takes place. Referring to the drawing, Figure 1 shows a hexahedral form of my packing element and Figure 2 shows a similar element in tetrahedral form. These elements are constructed with walls in the form of an open mesh or highly porous mat which may be of any suitable material having a labyrinthine fibrous structure of substantial thickness to provide for the flow of reflux liquid therethru by surface tension, while at the same time permitting the vapors to pass thru the walls of the elements into the interior and out again with little resistance to flow. It is important that the openings thru the walls of the hollow elements be sufficiently large to prevent closure by capillary action of the reflux liquid. The most suitable material I have found for the purpose is a plurality of layers of screen fabric, preferably metal. For my purpose I may use woven wire fabric such as hardware cloth or relatively coarse screen usually having a mesh opening of about one-eighth inch or larger. When such screen fabric is formed into cubical shapes and nested together, the openings thru a plurality of such screens ordinarily do not align themselves so that the vapors flowing thru the walls of the packing elements are forced to travel in a zigzag or tortuous path.

Another structural material for my vapor-liquid contacting elements is expanded metal fabric such as that commonly used for plaster lath. A plurality of shapes formed of such material are nested together to produce a very effective fractionating structure with a high ratio of surface-to-volume conducive to good fractionation.

In the construction of my packing elements of screen cloth or metal lath, I usually use at least three layers and preferably about four to six layers in order to obtain the most satisfactory mat wall structure. I may also employ a structure in the form of a fibrous packing material such as coarsely spun glass wool, steel wool, or metal turnings retained within screen cloth, perforated sheets, etc. Any suitable metal in fibrous form is retained between two layers of hardware cloth, for example, or other foraminous material having sufficient physical strength to maintain the structure in the desired form of hollow cube, rectangular hexahedron or tetrahedron.

Figure 1 shows a packing element constructed of multiple layers of wire cloth illustrated in the form of a cube with a section cut away to show the layers 10, 11 and 12. The cube or rectangular polyhedron can be open at one or both ends altho it is preferred for structural reasons and for reasons of fractionating efficiency to employ a structure in which the space within the cube is completely enclosed within the foraminous mat walls. In assembling the elements forming a plurality of layers of screen fabrics, telescoped shapes in a series of slightly increasing sizes are conveniently formed in a press with one or two faces open. These are easily assembled in the form of a completely enclosed structure by reversing the open faces of successive shapes. The same method may be employed in assembling the tetrahedral shapes which are conveniently folded from flat rectangular sheets into tetrahedra with one open face for nesting. The resulting structure possesses considerable mechanical strength after assembling. In any method of construction it is desirable that the hollow fractionating elements be given the maximum physical strength compatible with high porosity of the mat walls and easy manufacturing.

In general, it is desirable that the mat walls of the hollow packed tetrahedral or hexahedral elements have a thickness within the range of about one-fourth to one-twentieth the diameter or thickness of the polyhedron. For this relationship the diameter in the case of the hexahedron is taken as the shortest dimension between two opposite faces and in the case of the tetrahedron it is the shortest altitude from a base to the opposite apex.

As indicated hereinabove it is important to maintain adequate porosity in the foraminous mat walls of the fractionating elements to allow free access of vapor while at the same time providing for surface tension flow of reflux liquid thru the walls along the fibers of which the mats are constructed. As already indicated it is important that the pores or mesh in the case of fabrics be sufficiently large to prevent their capillary closure by the reflux liquid, since capillary closure of the pores would retard or prevent the free flow of vapor thru the labyrinthine passages of the mat walls. Where a woven fabric is employed, it is desirable that it be at least as coarse as about ten mesh, preferably about one-half inch to one-fourth inch mesh, coarser mesh being employed in the case of larger elements, for example elements of four inches in diameter or larger. In general, it is desirable that the diameter of the openings of the pores in foraminous fabrics of which the elements may be constructed should be about the same as the thickness of the mat wall. However, this relationship is only approximate and may be varied from about one-half the thickness to twice the thickness of the wall. In the case of mats constructed of irregular fibrous material such as coarse glass wool, steel wool, metal turnings, excelsior, etc., the diameter of the pores may be taken as the average distance between adjacent fibers lying in the same plane parallel to the wall of the structure.

In general, the dimensions of the packing elements vary with the size of the fractionating tower in which they are employed. In small laboratory apparatus, the elements may be of the order of one inch in the greatest dimension, whereas in large commercial installations the elements may have a diameter of the order of four inches to one foot or even larger, the mat walls being correspondingly thicker with the large sizes as previously indicated. The invention is not restricted to any specific sizes of packing elements but resides in the hollow, polyhedral structure with matted walls.

The application of my novel fractionating tower packing structure to a fractionating apparatus is illustrated in Figure 3. Referring to the drawing, grid 15 at the bottom of the tower 16 supports packing elements 17 which may be of the hexahedral or of the tetrahedral type. The grids may be shaped on the surface to support the packing in the desired arrangement without distortion. The packing elements must be placed so that they form a solid structure with no openings that will allow the vapors to flow around in preference to passing through the wall of the packing unit. The packing must also be installed in such a way that bypassing of the vapor along the wall of the vessel is prevented. This may be accomplished by the use of a suitable packing material such as glass wool, asbestos rope, etc., as shown at 30, either alone or in conjunction with cutting or shaping the peripheral packing units so that they conform closely to the wall shape. Reflux diverting rings 31 may also be spaced at intervals thru the height of the tower.

In the case of the hexahedral elements, it is preferred that they be placed corner-wise, i. e. with the greatest diagonal dimension in a substantially vertical position. In the case of the tetrahedral elements arrangement is such that a solid structure results that is symmetrical with the tower as indicated at 19.

The arrangement of the packing elements as described results in a solid structure of units thru which the vapors pass between the inclosed spaces of adjoining elements and that effects excellent distribution and redistribution of reflux liquid. In other respects the operation of the fractionator is conventional. Reflux liquid is distributed at the top of the tower by perforated spreader 20, vapors being drawn off at 21 and condensed by means not shown, the reflux condensate being returned thru 29 at any desired regular rate. Manholes 22 are provided for introducing the packing material and removing it when necessary for cleaning or replacing.

Feed is supplied to an intermediate point in the tower by line 23. Reboiling in the lower part of the tower is effected by withdrawing a portion of the bottom condensate by line 24 and conducting it to reboiler exchanger 25, whence the hot liquid and vapors are returned to the tower by line 26. Heat for reboiling is supplied by line 27 in the form of steam, superheated steam, hot oil or other suitable heating fluid which leaves the reboiler by line 28. The bottoms can be withdrawn from the fractionator by line 29. If desired, reboiling may be accomplished by a conventional heating coil submerged in the base of the fractionator or the fractionator may be heated electrically in the case of small units.

Having thus described my invention what I claim is:

1. A fractionating column packing cell structure comprising a hollow polyhedron having substantially planar laminated walls, each of said walls comprising a plurality of foraminous sheets produced by a multiplicity of nested polyhedrons, each polyhedron having one open face and each alternate polyhedron having its open face reversed with respect to the next nested polyhedron, and openings through the individual foraminous sheets of sufficient size to prevent capillary closure thereof by reflux liquid during the operation of the column, the adjacent sheets of each wall being in capillary contact with each other and the outside face of each wall being adapted for capillary contact with an adjacent cell structure, thereby to provide tortuous passages for the flow of vapor through said cell structure and for the flow of liquid about the walls of said cell structure.

2. The packing structure of claim 1 wherein the laminated walls of said structure have a thickness within the range of about one-fourth to one-twentieth the diameter of said structure.

3. The packing structure of claim 1 wherein the pores of the individual sheets of said foraminous laminated walls have a diameter about equal to the thickness of said walls.

4. The fractionating column packing cell structure of claim 1 wherein said foraminous sheets are a woven wire hardware cloth at least as coarse as 10 mesh per inch.

5. The packing cell structure of claim 1 wherein said foraminous sheets are expanded metal sheets.

6. A fractionating column packing structure comprising a hollow polyhedral cell consisting essentially of a plurality of nested polyhedral hollow units having walls which are constructed of foraminous sheets, the pores of such individual sheets being of sufficient size to prevent capillary closure of the individual pores by reflux liquid during operation in a fractionating apparatus, each said unit having one less wall than faces and having each alternate open face in register with a wall of the next nested unit, and each nested unit being in capillary contact with each adjacent unit so as to provide capillary flow between the nested units and between adjacent hollow polyhedral cells, the individual walls of each cell having a substantially planar expanse to provide capillary contact with a substantially planar expanse of an adjacent cell.

7. A fractionating column packing comprising hollow polyhedron cell structures having substantially planar laminated walls, each of said walls comprising a plurality of foraminous sheets produced by a multiplicity of nested polyhedrons, each polyhedron having one open face and each alternate polyhedron having said open face in register with a wall of the next nested polyhedron, a layer of disordered coarsely fibered material between adjacent sheets of each wall, openings through the individual foraminous sheets and through the layer of disordered material of sufficient size to prevent capillary closure thereof by reflux liquid during the operation of the column, each outside face of each cell being adapted for substantially continuous capillary contact with an outside face of an adjacent cell structure.

8. The packing structure of claim 7 wherein said disordered fibrous material is glass wool.

9. The packing structure of claim 7 wherein said disordered fibrous material is comprised of metal turnings.

10. The packing structure of claim 7 wherein the hollow polyhedron is a tetrahedron having three walls and one open face.

JOHN A. RIDGWAY, Jr.

REFERENCES CITED

The following references are of record in the file of this patent:

UNITED STATES PATENTS

| Number | Name | Date |
|---|---|---|
| 1,365,671 | Fairlie | Jan. 18, 1921 |
| 2,405,593 | Melvill | Aug. 13, 1946 |

FOREIGN PATENTS

| Number | Country | Date |
|---|---|---|
| 380,746 | Great Britain | Sept. 22, 1932 |
| 526,609 | Great Britain | Sept. 23, 1940 |
| 263,200 | Germany | Aug. 29, 1912 |
| 501,196 | Germany | June 28, 1930 |
| 647,108 | France | July 28, 1928 |